US012651870B2

(12) United States Patent
Resendez et al.

(10) Patent No.: US 12,651,870 B2
(45) Date of Patent: Jun. 9, 2026

(54) CONNECTOR ASSEMBLY

(71) Applicant: Molex, LLC, Lisle, IL (US)

(72) Inventors: Javier Resendez, Streamwood, IL (US); Jerber Mendoza, Aurora, IL (US); John C. Laurx, Aurora, IL (US); Jose J. Gonzalez, Jr., Joliet, IL (US); Marc E. Krause, Darien, IL (US); Scott Edwards, Little Rock, AR (US); William J. Miller, II, New Lenox, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 18/868,789

(22) PCT Filed: May 15, 2024

(86) PCT No.: PCT/IB2024/054700
§ 371 (c)(1),
(2) Date: Nov. 25, 2024

(87) PCT Pub. No.: WO2024/241148
PCT Pub. Date: Nov. 28, 2024

(65) Prior Publication Data

US 2026/0066589 A1 Mar. 5, 2026

Related U.S. Application Data

(60) Provisional application No. 63/503,642, filed on May 22, 2023.

(51) Int. Cl.
*H01R 13/6584* (2011.01)

(52) U.S. Cl.
CPC ................................ *H01R 13/6584* (2013.01)

(58) Field of Classification Search
None
See application file for complete search history.

(56) References Cited

U.S. PATENT DOCUMENTS 9,166,344 B2 10/2015 Pan
9,455,534 B2 9/2016 Resendez et al.
(Continued)

FOREIGN PATENT DOCUMENTS

CN 105789987 A 7/2016
CN 107078426 A * 8/2017 ............. H01R 12/73
(Continued)

OTHER PUBLICATIONS

International Search Report and Written Opinion received for PCT Application No. PCT/IB2024/054700, mailed on Sep. 30, 2024, 6 pages.
(Continued)

*Primary Examiner* — Tho D Ta

(57) ABSTRACT

Connector assemblies for high speed data communication are described. In one example, a connector assembly includes a plug mating interface, a surface mating interface, and a wafer assembly between the plug mating interface and the surface mating interface. The wafer assembly includes a wafer insert, a channel shield, a plurality of signal conductors extending within the channel shield, a conductive gasket positioned over open edges of the channel shield, and a shield cover positioned over the conductive gasket. The conductive gasket can be embodied as a conductive elastomeric gasket and provides a conductive shield over open edges of the channel shield. The conductive gasket can be positioned between the shield cover and the open edges of the channel shield. The conductive gasket and the shield cover help to enclose open areas in the channel shield and provide additional shielding for the signal conductors.

20 Claims, 13 Drawing Sheets

(56) References Cited

U.S. PATENT DOCUMENTS

| | | | |
|---|---|---|---|
| 9,490,571 | B1 | 11/2016 | Annis et al. |
| 9,515,429 | B2 | 12/2016 | De Geest et al. |
| 9,991,639 | B2 | 6/2018 | Resendez et al. |
| 10,424,860 | B2 * | 9/2019 | Okuyama .............. H01R 31/08 |
| 10,431,936 | B2 * | 10/2019 | Horning ............... H01R 13/502 |
| 2014/0017950 | A1 | 1/2014 | Peloza |
| 2015/0207247 | A1 | 7/2015 | Regnier et al. |
| 2016/0028189 | A1 | 1/2016 | Resendez |
| 2016/0344141 | A1 | 11/2016 | Cartier, Jr. et al. |
| 2017/0005445 | A1 | 1/2017 | Resendez et al. |
| 2017/0093090 | A1 | 3/2017 | Laurx |
| 2020/0119498 | A1 | 4/2020 | Laurx et al. |
| 2020/0287332 | A1 | 9/2020 | Chen et al. |
| 2020/0287333 | A1 | 9/2020 | Chen |
| 2021/0203106 | A1 | 7/2021 | Hsiao et al. |
| 2021/0203109 | A1 | 7/2021 | Wang et al. |
| 2021/0234291 | A1 | 7/2021 | Zerebilov |
| 2021/0281016 | A1 | 9/2021 | Laurx et al. |
| 2022/0329015 | A1 | 10/2022 | Provencher et al. |
| 2022/0368084 | A1 | 11/2022 | He et al. |

FOREIGN PATENT DOCUMENTS

| | | | |
|---|---|---|---|
| CN | 216450840 | U | 5/2022 |
| CN | 114784565 | A | 7/2022 |
| CN | 217642035 | U | 10/2022 |
| CN | 115411577 | A | 11/2022 |
| CN | 218182637 | U | 12/2022 |
| CN | 218482414 | U | 2/2023 |
| EP | 1094547 | B1 | 4/2005 |
| JP | 2004103527 | A | 4/2004 |
| TW | I604674 | B | 11/2017 |
| TW | M614360 | U | 7/2021 |
| TW | 202135385 | A | 9/2021 |
| TW | M616729 | U | 9/2021 |
| TW | I780586 | B | 10/2022 |
| TW | I792271 | B | 2/2023 |
| WO | 2022123523 | A1 | 6/2022 |

OTHER PUBLICATIONS

Amphenol ICC, “Paladin® HD 112G Backplane Interconnect System”, Amphenol Information Communications and Commercial Products, Retrieved on Feb. 3, 2025, 2 pages.

Amphenol ICC,“ExaMAX2 Connector System”, GS-12-1565, Apr. 20, 2021, 12 pages.

International Search Report and Written Opinion received for PCT Application No. PCT/IB2024/053738, mailed on Jul. 11, 2024, 9 pages.

International Search Report and Written Opinion received for PCT Application No. PCT/IB2024/053828, mailed on Jul. 25, 2024, 8 pages.

TE Connectivity, “Strada Whisper Absolute Connectors”, 2021, 2 pages.

International Preliminary Report on Patentability (Chapter I) received for PCT Application No. PCT/IB2024/053738, mailed on Dec. 4, 2025, 8 pages.

International Preliminary Report on Patentability (Chapter I) received for PCT Application No. PCT/IB2024/053828, mailed on Dec. 4, 2025, 7 pages.

International Preliminary Report on Patentability (Chapter I) received for PCT Application No. PCT/IB2024/054700, mailed on Dec. 4, 2025, 5 pages.

* cited by examiner

CONNECTOR ASSEMBLY

RELATED APPLICATIONS

This application claims the benefit of U.S. Provisional Ser. No. 63/503,642 filed on May 22, 2023. The disclosure of the above-identified application is herein incorporated by reference in its entirety.

BACKGROUND

A range of input/output (I/O) connectors are designed for power, data, and power and data interconnect systems, including board-to-board, wire-to-wire, and wire-to-board systems. A variety of designs exist for each type of system, depending on the requirements of the power and data communications environment in which the connectors are used. As one example, a wire-to-board system includes a free-end connector attached to a wire and a fixed-end connector attached to a board.

High data rate connectors, cable assemblies, and interconnection systems often rely upon differentially coupled signal pairs in which two conductors are arranged in a pair to transmit a differential signal. The signal being transmitted is embodied by the electrical difference measured between the conductor pair. Differential signaling can be helpful to avoid spurious signals and crosstalk and avoid inadvertent signaling modes among adjacent signals pairs. In connector interfaces, ground terminals can be relied upon to create a return path to electrical ground, provide shielding between differential pairs, and for other purposes.

Connectors used in high data rate applications are typically designed to meet a range of mechanical and electrical requirements. High data rate connectors are often used in backplane applications, as one example, that require very high conductor density and data rates. To achieve the desired mechanical and electrical requirements, the connectors used in such applications often incorporate one or more wafer assemblies. The use of wafer assemblies can be helpful to manufacture connectors capable of achieving high data rates using a number of different assembly processes.

SUMMARY

Various aspects and embodiments of high speed connector assemblies are described. In one example, a connector assembly includes a plug mating interface, a surface mating interface, and a wafer assembly between the plug mating interface and the surface mating interface. The wafer assembly includes a wafer insert, a channel shield, a plurality of signal conductors extending within the channel shield, a conductive gasket positioned over open edges of the channel shield, and a shield cover positioned over the conductive gasket. The conductive gasket can be embodied as a conductive elastomeric gasket and provides a conductive shield over open edges of the channel shield. The conductive gasket can be positioned between the shield cover and the open edges of the channel shield. In other examples, the wafer assembly further includes a second channel shield, and the conductive gasket is positioned over open edges of the channel shield and over second open edges of the second channel shield.

In other aspects of the embodiments, the channel shield includes shield tail contacts ends, the shield cover includes side tail contacts and a center tail contact, and the signal conductors include signal tail contact ends. The signal tail contact ends of the signal conductors are positioned between the shield tail contacts ends of the channel shield and adjacent to the center tail contact of the shield cover at the surface mating interface. In other aspects, the channel shield further includes a shield tongue. The signal tail contact ends of the signal conductors are positioned between the shield tail contacts ends of the channel shield, in a front to back direction of the connector assembly, and between the center tail contact of the shield cover and the shield tongue of the channel shield, in a left to right direction of the connector assembly, at the surface mating interface.

In other aspects of the embodiments, the connector assembly also includes a surface interface shield positioned at the surface mating interface of the connector assembly. The surface interface shield can be embodied as a plated plastic. At the surface mating interface, the channel shield and the signal conductors can extend through an aperture in the surface interface shield. The channel shield can contact inner surfaces of the aperture in the surface interface shield. Additionally, at the surface mating interface, the shield cover can extend through a second aperture in the surface interface shield. The shield cover can contact inner surfaces of the second aperture in the surface interface shield.

In another embodiment, a wafer assembly includes a wafer insert, a channel shield, a signal conductors extending within the channel shield, a conductive gasket positioned over open edges of the channel shield, and a shield cover positioned over the conductive gasket. The conductive gasket can be embodied as a conductive elastomeric gasket and provides a conductive shield over open edges of the channel shield. The conductive gasket can be positioned between the shield cover and the open edges of the channel shield.

In another embodiment, a connector assembly includes a wafer assembly and a surface interface shield. The wafer assembly includes a wafer insert, a channel shield, signal conductors extending within the channel shield, a conductive gasket positioned over open edges of the channel shield, and a shield cover positioned over the conductive gasket. The surface interface shield can be embodied as a plated plastic component. The channel shield and the signal conductors can extend through an aperture in the surface interface shield, and the channel shield can contact inner surfaces of the aperture in the surface interface shield.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Connectors are typically designed to meet a range of mechanical and electrical requirements. High data rate connectors are often used in backplane applications, as one example, that require very high conductor density and data rates. To achieve the desired mechanical and electrical requirements, the connectors used in such applications often incorporate one or more wafer assemblies. The use of wafer assemblies can be helpful to manufacture connectors capable of high data rates using a range of different assembly processes. It is still challenging, in any case, to design wafers and connectors having the conductor density and small footprint needed for high data rate applications in new systems, while also maintaining the desired electrical characteristics for the transmission of data with integrity.

In the context outlined above, various aspects and embodiments of high speed connector assemblies are described. In one example, a connector assembly includes a plug mating interface, a surface mating interface, and a wafer assembly between the plug mating interface and the surface mating interface. The wafer assembly includes a wafer insert, a channel shield, a plurality of signal conductors extending within the channel shield, a conductive gasket positioned over open edges of the channel shield, and a shield cover positioned over the conductive gasket. The conductive gasket can be embodied as a conductive elastomeric gasket and provides a conductive shield over open edges of the channel shield. The conductive gasket can be positioned between the shield cover and the open edges of the channel shield. The conductive gasket and the shield cover help to enclose open areas in the channel shield and provide additional shielding for the signal conductors.

Figure 1A:
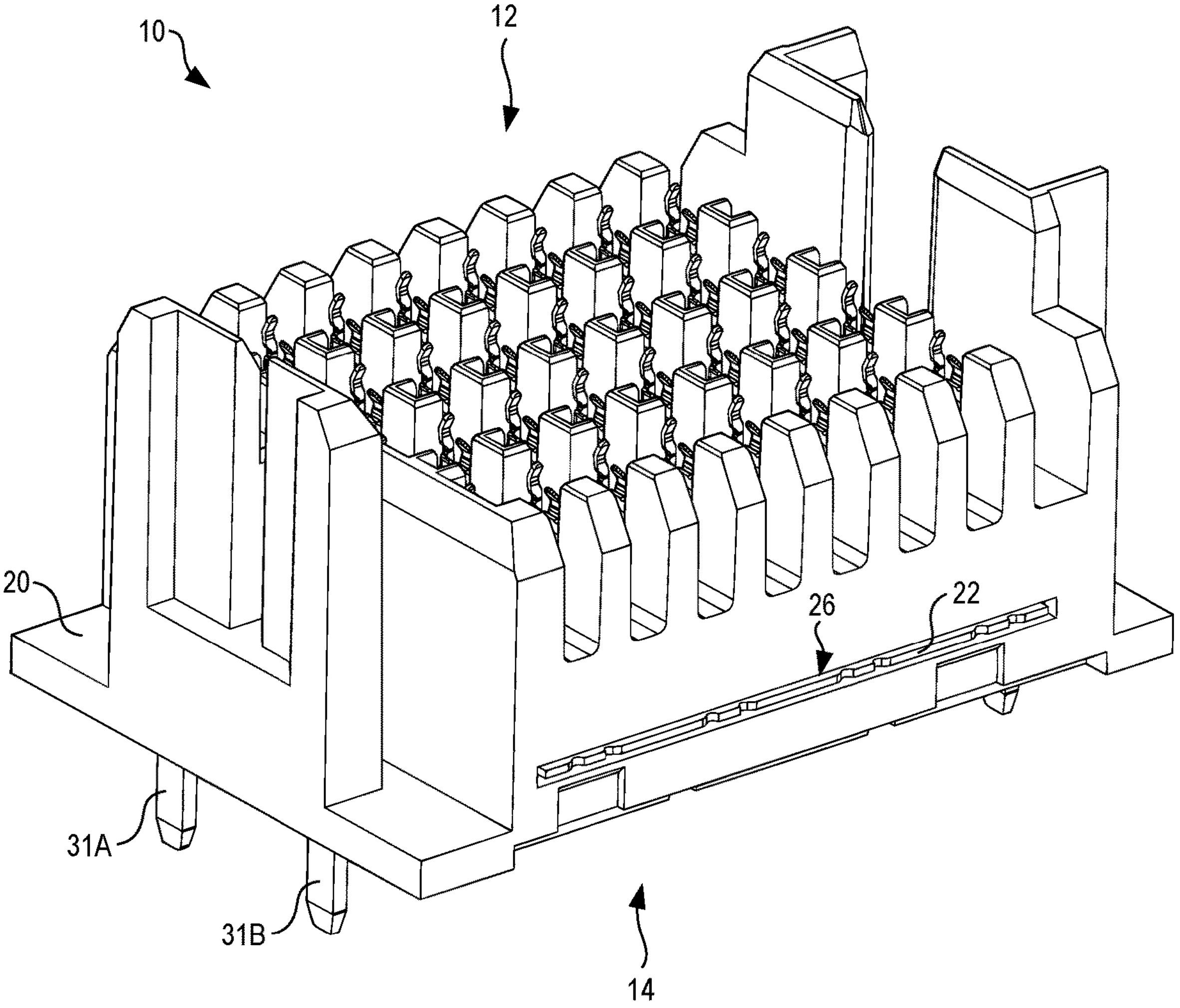
FIG. 1A illustrates a top perspective view of an example connector assembly according to various aspects of the present disclosure.
Figure 1B:
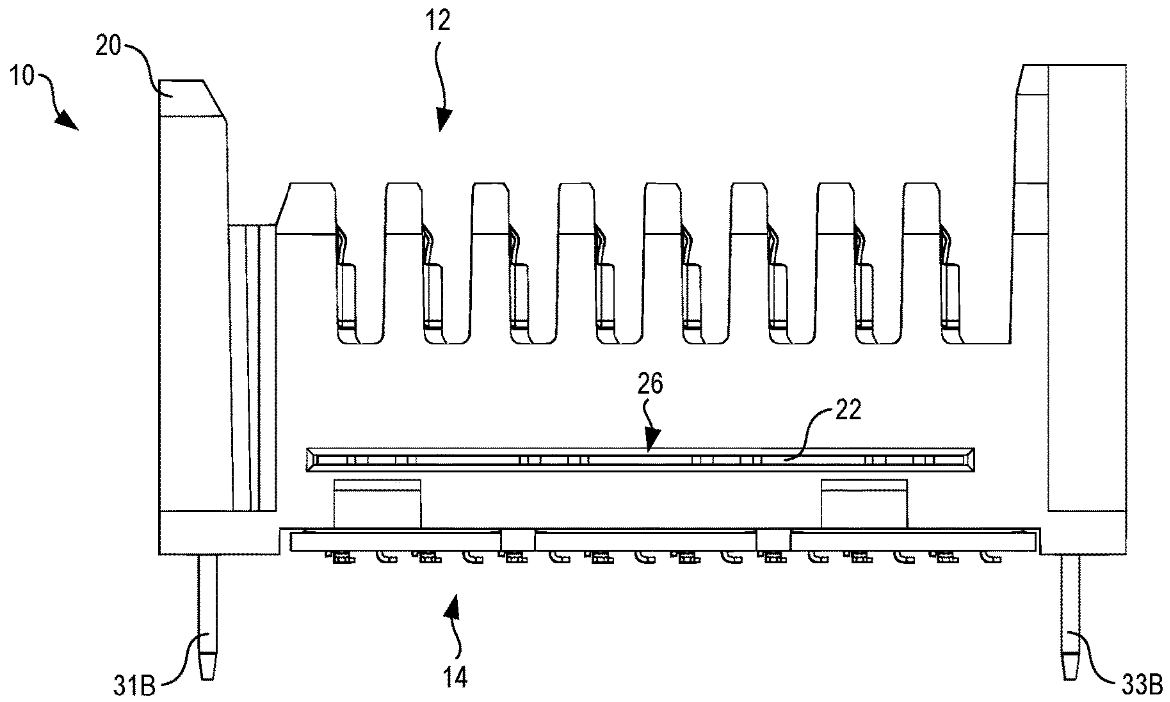
FIG. 1B illustrates a side view of the connector assembly shown in FIG. 1A according to various aspects of the present disclosure.
Figure 1C:
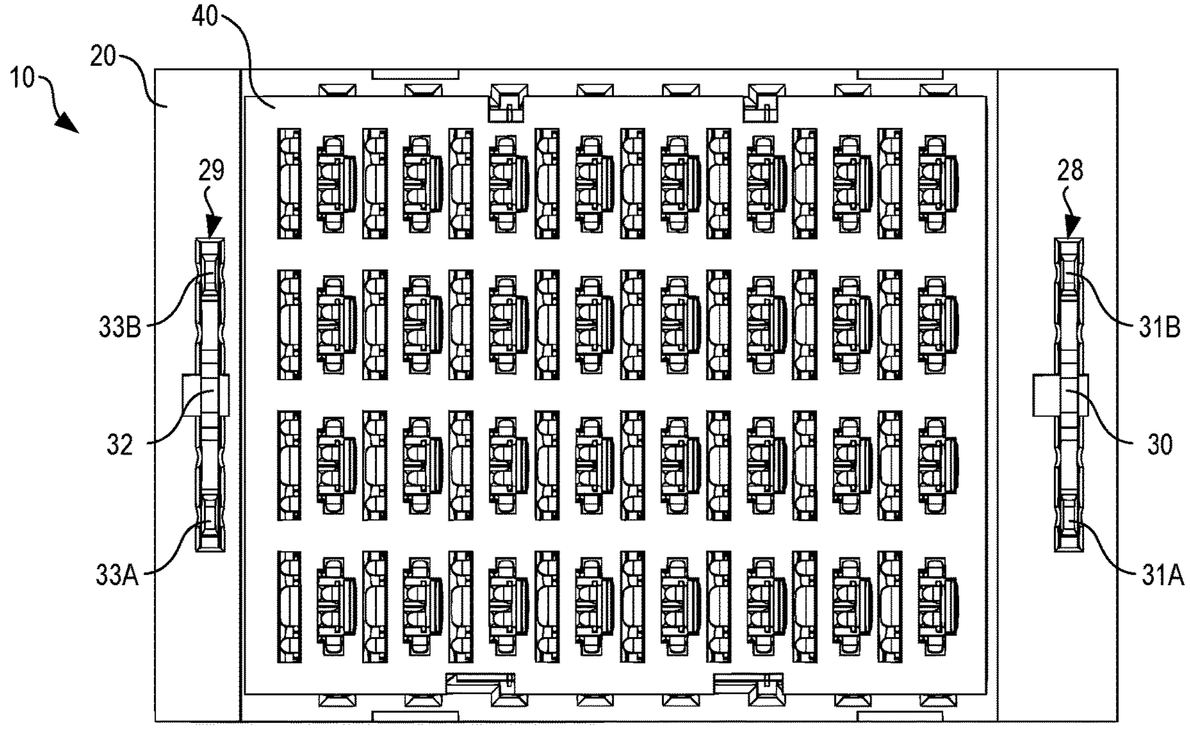
FIG. 1C illustrates a bottom view of the connector assembly shown in FIG. 1A according to various aspects of the present disclosure.

Turning to the drawings, FIG. 1A illustrates a top perspective view of an example connector assembly 10 (also "connector 10"), FIG. 1B illustrates a side view of the connector 10, and FIG. 1C illustrates a bottom view of the connector 10 according to various aspects of the present disclosure. The connector 10 is illustrated as a representative example and is not drawn to any particular scale or size. The shape, size, proportion, and other characteristics of the connector 10 can vary as compared to that shown. Additionally, while the connector 10 and other connectors discussed herein are described for use in high speed backplane and related interconnect applications, the concepts are not limited to use with such interconnect applications or systems. The concepts can be extended to use in other types of connectors for other types of interconnect applications or systems.

Referring among FIGS. 1A-1C, the connector 10 includes a plug mating interface 12 and a surface interface 14. In one example, a plug connector can be mated and electrically coupled to the connector 10 at the plug mating interface 12. In another example, the free end of an interconnect system cable can be mated and electrically coupled to the connector 10 at the plug mating interface 12. Additionally, the connector 10 is a hermaphroditic or genderless type of connector. In other words, a duplicate of the connector 10 could be rotated and mated to the connector 10 (i.e., to itself) at the plug mating interface 12.

The surface interface 14 of the connector 10 can be mounted and electrically coupled to a printed circuit board (PCB). The connector 10 also includes a housing 20, retention clips 22 and 24 (see FIG. 2B), alignment inserts 30 and 32 (see FIG. 1C) with support posts 31A, 31B, 33A, and 33B, and a surface interface shield 40, among other components. The connector 10 is a hermaphroditic or genderless type of connector. In other words, a duplicate of the connector 10 could be rotated and mated to the connector 10 (i.e., to itself) at the plug mating interface 12.

The housing 20 can be formed from a plastic or polymer, such as liquid crystal polymer (LCP), polyethylene (PE), polytetrafluoroethylene (PTFE), fluoropolymer, or other plastic or insulating material(s). The housing 20 can be formed using any suitable additive or subtractive manufacturing techniques, including molding, injection molding, printing, and other techniques. In some cases, the outer surfaces of the housing 20 can be plated with a plating metal or metals for conductivity, and housing 20 can be embodied as a plated plastic component. The surfaces can be etched in some cases and metalized or plated in a bath, barrel plated, plated by physical vapor deposition (PVD), plated by electroless plating, electroplating, sputter plating, ion plating, or other plating techniques or a combination thereof. The surfaces of the housing 20 can be metalized or plated with copper, nickel, tin, silver, another other plating metal, or a combination of such plating metals.

As described below, a number of wafer assemblies are positioned in a side-by-side arrangement within the housing 20. The housing 20 is positioned over and secures the wafer assemblies in the connector 10. The connector 10 includes eight wafer assemblies in the examples described herein. However, the connector 10 can include other numbers of wafer assemblies in other cases, including fewer or greater numbers of wafer assemblies. Each of the wafer assemblies, which are described in further detail below with reference to FIGS. 3A-3G, includes pairs of signal conductors and a channel shield for each pair of signal conductors. Each of the wafer assemblies includes four pairs of signal conductors and four channel shields in the examples shown. Each pair of signal conductors extends within a channel of a respective channel shield, and the channel shield provides a common ground and shield for the pair of signal conductors. These and other aspects of the wafer assemblies are described in further detail below.

The retention clips 22 and 24 can be separately formed from (e.g., stamped, sheared, or otherwise formed out of) a flat sheet of metal material. The retention clips 22 and 24 can be inserted into retention slits formed in the housing 20. As shown in FIG. 1B, for example, the retention clip 22 is inserted into the retention slit 26, which is formed through the housing 20. The retention clip 24 is inserted into another retention slit formed through an opposite side of the housing 20. The retention clips 22 and 24 include retention tabs, as described in further detail below with reference to FIG. 2A.

The alignment inserts 30 and 32 can be separately formed from (e.g., stamped, sheared, or otherwise formed out of) a flat sheet of metal material. The alignment inserts 30 and 32 can be inserted into alignment slits formed in the housing 20 in one example. As shown in FIG. 1C, the alignment inserts 30 and 32 are inserted into alignment slits 28 and 29 formed in the housing 20, respectively. The alignment inserts 30 and 32 can be secured within the alignment slits 28 and 29 by a mechanical interference or friction fit in one case. In other examples, the housing 20 can be molded around the alignment inserts 30 and 32.

The alignment insert 30 includes support posts 31A and 31B. The alignment insert 32 includes support posts 33A and 33B. The support posts 31A, 31B, 33A, and 33B extend down from a bottom surface of the housing 20 in the surface interface 14 region of the connector 10. Each of the support posts 31A, 31B, 33A, and 33B can be inserted into plated apertures of a PCB, for example, and soldered in place, when the surface interface 14 region of the connector 10 is secured upon and electrically coupled to the PCB. The support posts 31A, 31B, 33A, and 33B provide mechanical support to the connector 10 and help to reduce stress on tail contact ends of the connector 10, as described in further detail below, particularly when the connector 10 is mated with a plug connector at the plug mating interface 12.

Referring to FIG. 1C, the connector 10 includes the surface interface shield 40 at the surface interface 14 region of the connector 10. The surface interface shield 40 can be formed from a plated plastic material. For example, the surface interface shield 40 can be formed from LCP, PE, PTFE, or other plastic material and, in some cases, includes additives to which plating metal or metals will better adhere. The surface interface shield 40 can be formed using any suitable additive or subtractive manufacturing techniques, including molding, injection molding, printing, and other techniques. The outer surfaces of the surface interface shield 40 can be plated with a plating metal or metals for conductivity, and the surface interface shield 40 can be embodied as a plated plastic component. The surfaces can be etched in some cases and metalized or plated in a bath, barrel plated, plated by PVD, plated by electroless plating, electroplating, sputter plating, ion plating, or other plating techniques or a combination thereof. The surfaces of the surface interface shield 40 can be metalized or plated with copper, nickel, tin, silver, another other plating metal, or a combination of such plating metals. The surface interface shield 40 provides additional shielding at the surface interface 14 of the connector 10.

The surface interface shield 40 includes a number of apertures or openings, and ends of the wafer assemblies extend through the apertures or openings, as shown in FIG. 1C. The channel shields of each of the wafer assemblies also contact outer surfaces of the surface interface shield 40. Thus, the surface interface shield 40 electrically couples all the channel shields of the wafer assemblies in the connector 10 together at the surface interface 14 of the connector 10.

Figure 2A:
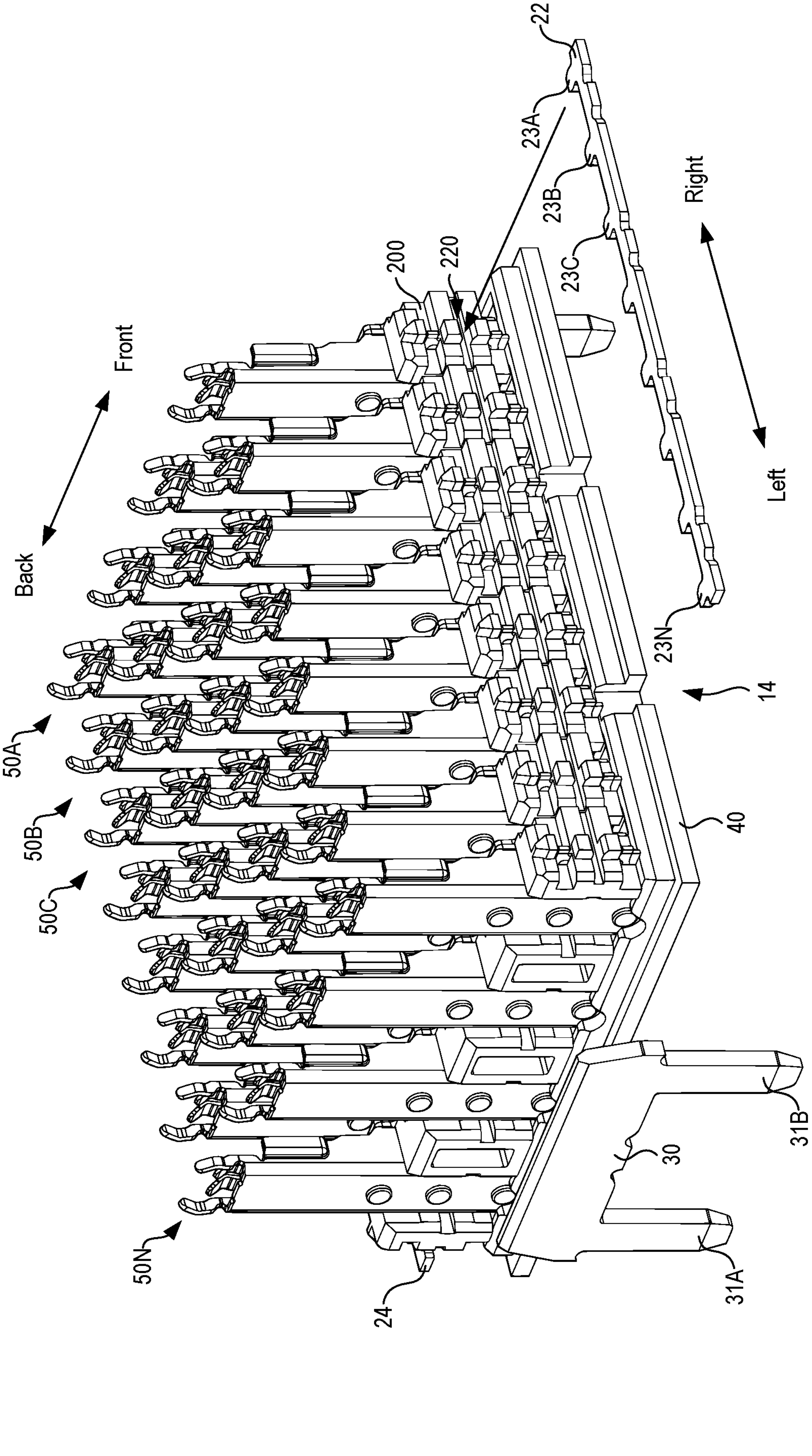
FIG. 2A illustrates a first side perspective view of the connector assembly shown in FIG. 1A, with parts omitted, according to various aspects of the present disclosure.
Figure 2B:
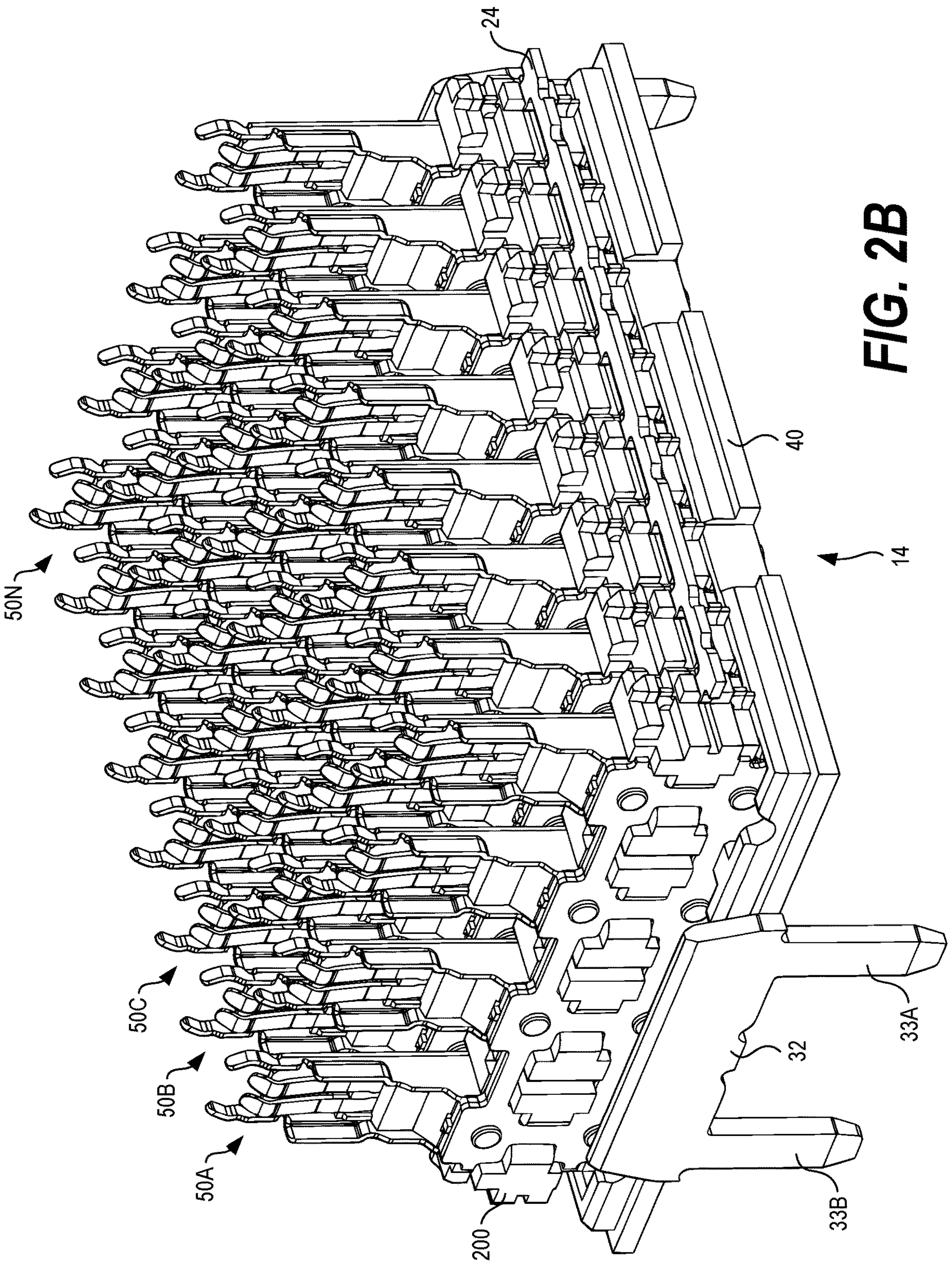
FIG. 2B illustrates a second side perspective view of the connector assembly shown in FIG. 1A, with parts omitted, according to various aspects of the present disclosure.

FIG. 2A illustrates a first side perspective view of the connector 10 shown in FIG. 1A, with parts omitted, and FIG. 2B illustrates a second side perspective view of the connector 10 shown in FIG. 1A, with parts omitted. Particularly, the housing 20 is omitted from view in FIGS. 1A and 1B. As shown, the connector 10 includes a number of wafer assemblies, including the wafer assemblies 50A, 50B, 50C, and 50N, among others (collectively "wafer assemblies 50"). The wafer assemblies 50 are positioned in a side-by-side arrangement in the connector 10. The connector 10 includes eight wafer assemblies 50 in the example shown. The connector 10 can include other numbers of wafer assemblies in other cases, however, including fewer or greater numbers of wafer assemblies.

Referring to FIG. 2A, the retention clip 22 includes retention tabs 23A-23N (collectively "retention tabs 23"). The retention clip 24 also includes similar retention tabs. When the retention clip 22 is inserted through the retention slit 26 in the housing 20 (see FIGS. 1A and 1B), the retention tabs 23 extend between and interlock into the retention channels of the wafer assemblies 50, holding and securing them in place with respect to the housing 20 in the connector 10. For example, the retention tab 23A of the retention clip 22 extends into the retention channel 220 of the wafer assembly 50A, as shown in FIG. 2A, and the other retention tabs 23 extend into similar retention tabs among the wafer assemblies 50. Additionally, the retention clip 24 is inserted through another retention slit at an opposite side of the housing 20 (i.e., the opposite side of the housing 20 shown in FIG. 1B), and the retention tabs of the retention clip 24 extend between and interlock into retention channels on another side of the wafer assemblies 50.

Figure 2C:
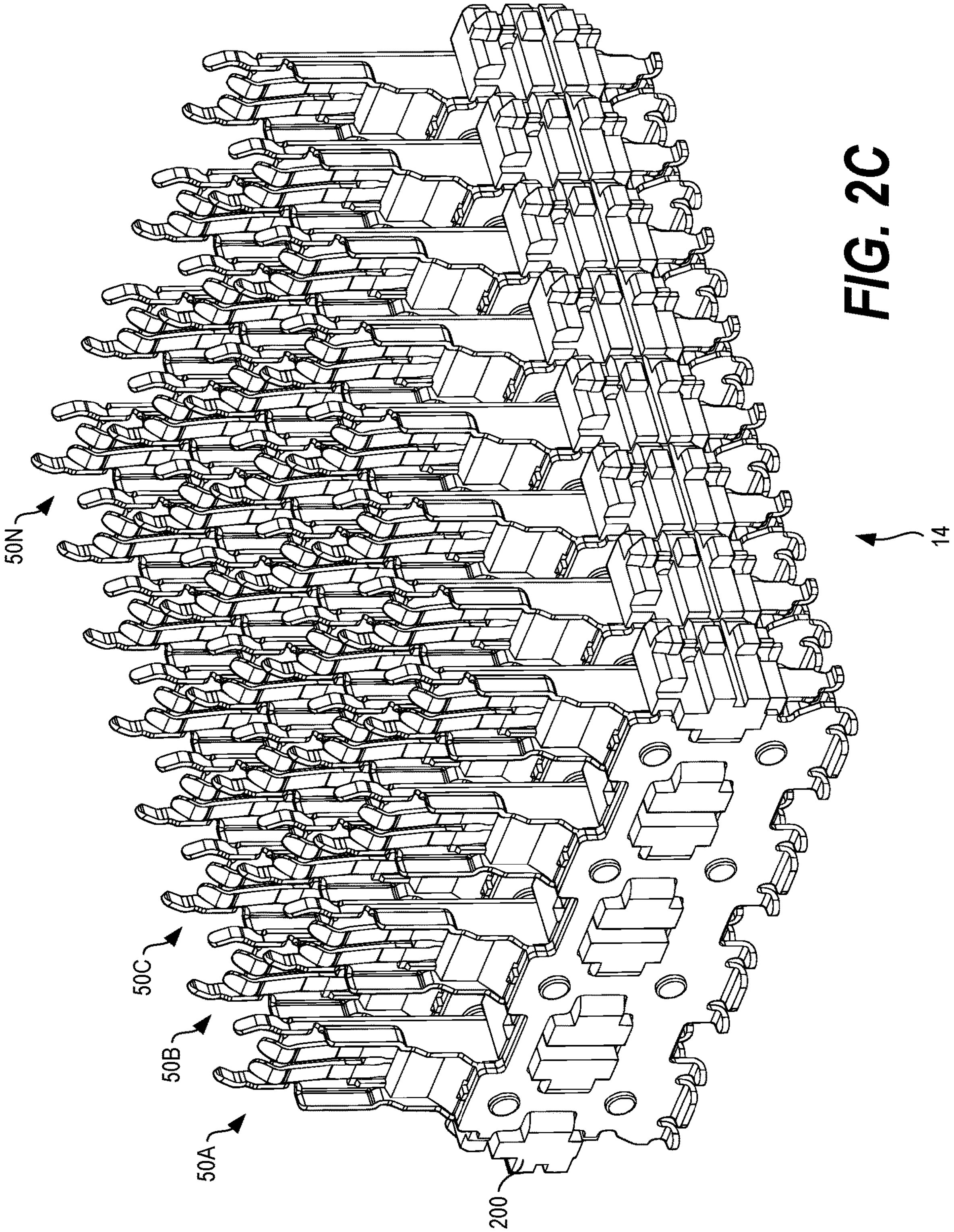
FIG. 2C illustrates the second side perspective view of the connector assembly shown in FIG. 1A, with parts omitted, according to various aspects of the present disclosure.

FIG. 2C illustrates the second side perspective view of the connector 10 shown in FIG. 1A, with parts omitted. The housing 20, the alignment inserts 30 and 32, and the surface interface shield 40 are omitted view in FIG. 2C. The surface mount (SMT) tails of the wafer assemblies 50 are visible in FIG. 2C. The tail ends of the wafer assemblies 50 can be electrically coupled (e.g., soldered, sintered, etc.) to conductive pads or traces on a PCB when the connector 10 is mounted and coupled to the PCB. The tail ends of the wafer assemblies 50 are described in further detail below.

Figure 3A:
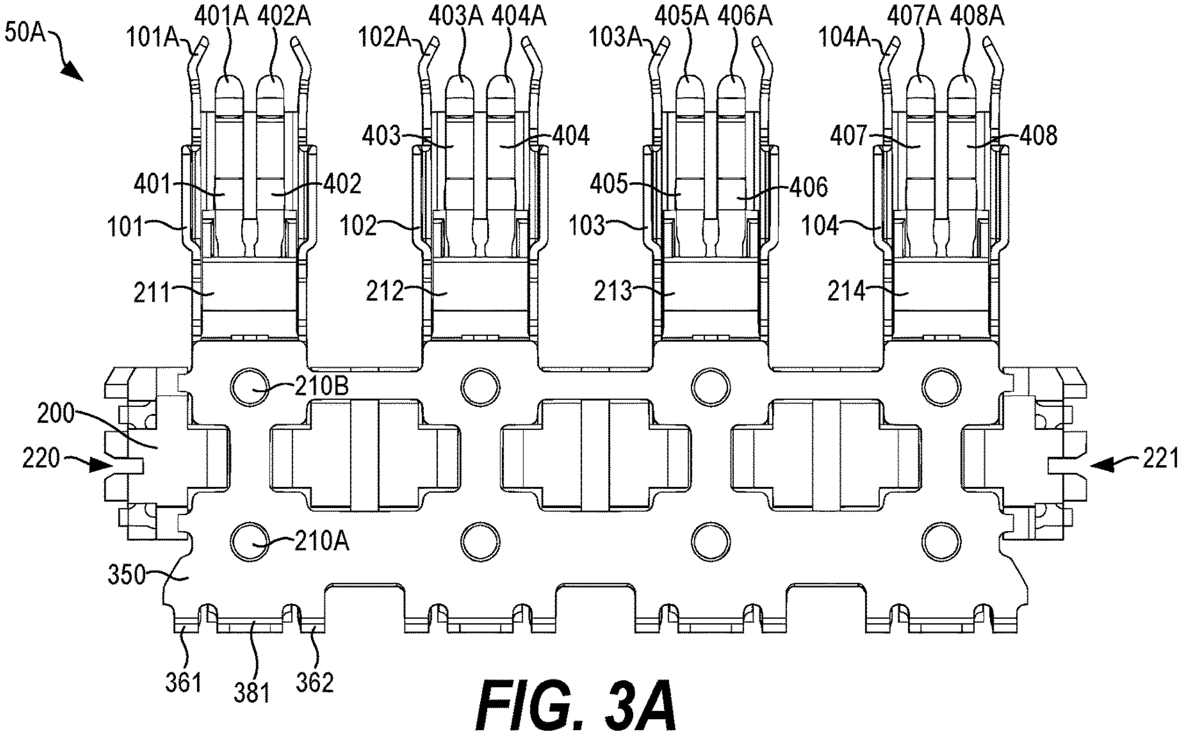
FIG. 3A illustrates a front view of a wafer assembly in the connector assembly shown in FIG. 1A according to various aspects of the present disclosure.
Figure 3B:
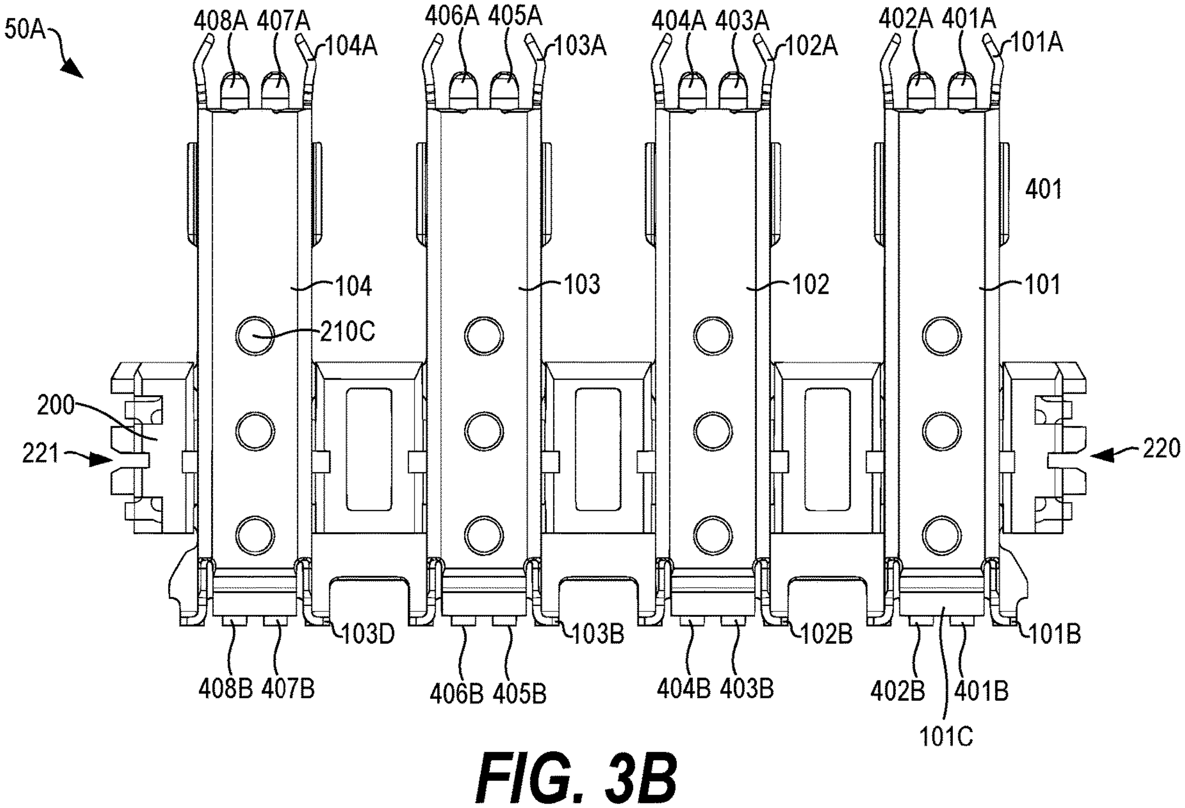
FIG. 3B illustrates a back view of the wafer assembly shown in FIG. 3A according to various aspects of the present disclosure.
Figure 3C:
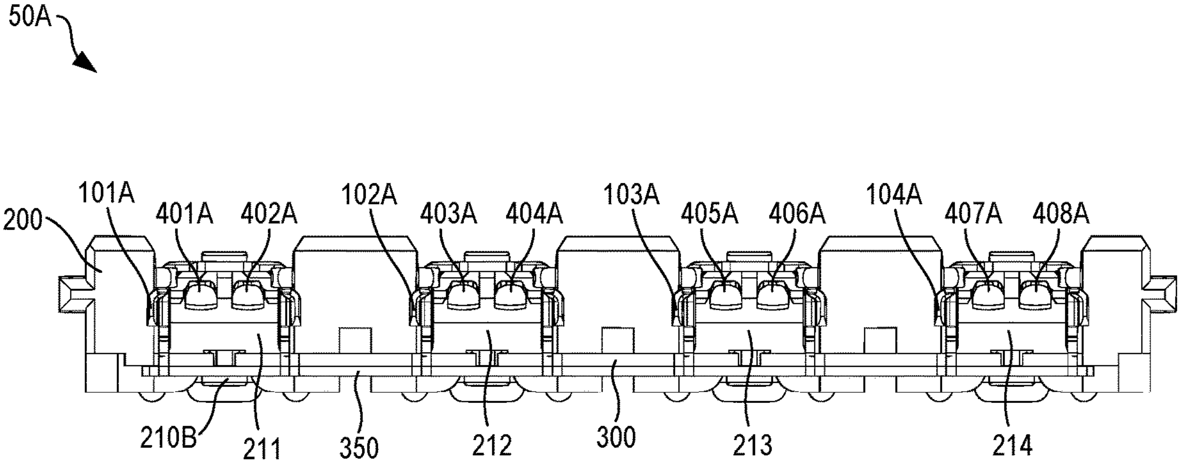
FIG. 3C illustrates a top view of the wafer assembly shown in FIG. 3A according to various aspects of the present disclosure.
Figure 3D:
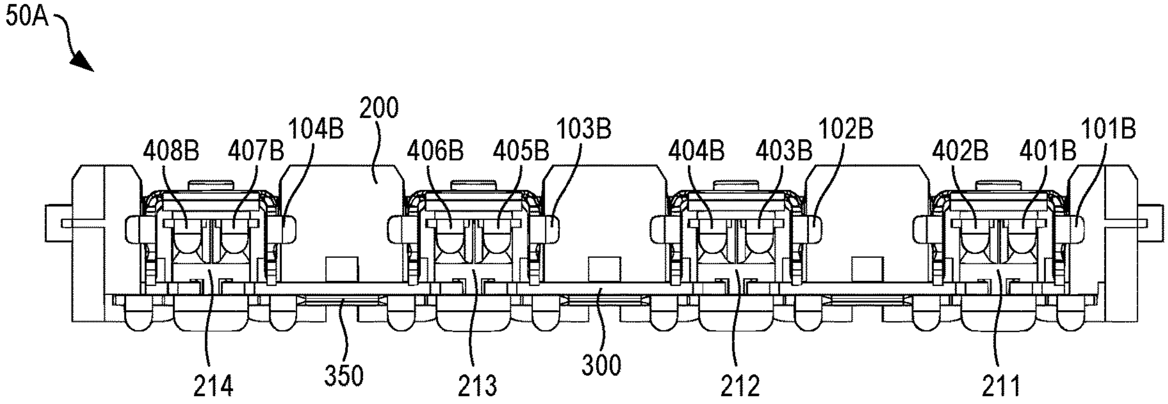
FIG. 3D illustrates a bottom view of the wafer assembly shown in FIG. 3A according to various aspects of the present disclosure.

FIG. 3A illustrates a front view of the wafer assembly 50A in the connector 10 shown in FIG. 1A, FIG. 3B illustrates a back view of the wafer assembly 50A, FIG. 3C illustrates a top view of the wafer assembly 50A, and FIG. 3D illustrates a bottom view of the wafer assembly 50A. The wafer assembly 50A is illustrated as a representative example and is not drawn to any particular scale or size. The shape, size, proportion, and other characteristics of the wafer assembly 50A can vary as compared to that shown. Each of the wafer assemblies 50 in the connector 10 can be similar to, and include the same components and features as, the wafer assembly 50A.

Referring among FIGS. 3A-3D, the wafer assembly 50A includes channel shields 101-104, a wafer insert 200, a conductive gasket 300, a shield cover 350, and signal conductors 401-408. The signal conductors 401-408 are conductors for data signals through the connector 10. The channel shields 101-104 are common or ground shields in the connector 10 and, along with the surface interface shield 40, the conductive gasket 300, and the shield cover 350, form a common shield or ground network for the connector 10.

The channel shields 101-104 are formed as U-shaped shields in the examples described herein, although the channel shields 101-104 can be formed in other shapes. Each of the channel shields 101-104 includes a pair of sidewalls which extend substantially orthogonal to a back wall, to form a U-shaped shield. Pairs of the signal conductors 401-408 extend within channels of the channel shields 101-104. Particularly, the signal conductors 401 and 402 extend within a channel of the channel shield 101, the signal conductors 403 and 404 extend within a channel of the channel shield 102, the signal conductors 405 and 406 extend within a channel of the channel shield 103, and the signal conductors 407 and 408 extend within a channel of the channel shield 104. The signal conductors 401-408 include signal lead contact ends 401A-408A, respectively, and signal tail contact ends 401B-408B, respectively.

Among other contacts ends, the channel shields 101-104 include shield lead contact ends 101A-104A, respectively, and shield tail contact ends 101B-104B, respectively. Each of the shield lead contact ends 101A-104A extends from one end of a first sidewall of the channel shields 101-104, respectively. Each of the shield tail contact ends 101B-104B extends from another end of the first sidewall of the channel shields 101-104, respectively. Each of the channel shields 101-104 also includes another shield lead contact end that extends from a second sidewall of the channel shields 101-104. Additionally, each of the channel shields 101-104 includes another shield tail contact end that extends from the second sidewall of the channel shields 101-104, respectively.

The signal conductors 401-408 can be formed from (e.g., stamped, sheared, or otherwise formed out of) a flat sheet of metal, such as a lead frame. In some cases, the sheet of metal or lead frame can be plated with one or more plating metals. The shapes of the signal lead contact ends 401A-408A and the signal tail contact ends 401B-408B, respectively, can be formed by bending, pressing, or stamping. As described in further detail below with reference to FIG. 4B, the signal tail contact ends 401B-408B are formed into J-leads for SMT coupling to a PCB. In other examples, the signal tail contact ends 401B-408B can be formed as through-hole (e.g., "eye of needle"(EON)) or other styles of contacts.

The channel shields 101-104 can be separately formed from (e.g., stamped, sheared, or otherwise formed out of) a flat sheet of metal material. The shapes of the shield lead contact ends 101A-104A and the shield tail contact ends 101B-104B, respectively, can be formed by bending, pressing, or stamping. As also described in below with reference to FIG. 4B, the shield tail contact ends 101B-104B are also formed into J-leads for SMT coupling to a PCB. In other examples, the shield tail contact ends 101B-104B can be formed as EON or other styles of contacts.

The wafer insert 200 can be formed from a plastic or polymer, such as LCP, PE, PTFE, fluoropolymer, or other plastic or insulating material(s). The wafer insert 200 can be molded around the lead frame from which the signal conductors 401-408 are formed, before the signal conductors 401-408 are separated from the larger lead frame. The wafer insert 200 secures and positions the signal conductors 401-408 with respect to each other and with respect to the other components of the wafer assembly 50A. As examples, the wafer insert 200 secures and positions the signal conductors 401-408 with respect to the channel shields 101-104, the conductive gasket 300, and the shield cover 350.

The wafer insert 200 includes channel spacers 211-214. The channel spacers 211-214 are sized to fit into the U-shaped channels within the channel shields 101-104. The channel spacers 211-214 support the signal conductors 401-408 within and electrically isolate the signal conductors 401-408 from the channel shields 101-104. The channel spacers 211-214 maintain the positions and spacings of the signal conductors 401-408 within the channels of the channel shields 101-104.

As described above, the wafer insert 200 can be molded around the lead frame from which the signal conductors 401-408 are formed, before the signal conductors 401-408 are separated from the larger lead frame. Thus, in the wafer assembly 50A, the signal conductors 401 and 402 extend through the channel spacer 211, the signal conductors 403 and 404 extend through the channel spacer 212, the signal conductors 405 and 406 extend through the channel spacer 213, and the signal conductors 407 and 408 extend through the channel spacer 214. When the wafer insert 200 is first molded around the signal conductors 401-408, the wafer insert 200 includes a number of staking posts. Particularly, each of the channel spacers 211-214 includes a number of staking posts. The staking posts are used to secure the components of the wafer assembly 50A together, as described below.

After the wafer insert 200 is formed around the signal conductors 401-408 of the lead frame, the channel shields 101-104 can be inserted and positioned around the channel spacers 211-214 of the wafer insert 200. The channel shields 101-104 include a number of apertures or openings. The channel shields 201-204 are positioned around the channel spacers 211-214 with the staking posts of the channel spacers 211-214 extending through the apertures of the channel shields 201-204. Additionally, the conductive gasket 300 and the shield cover 350 are also formed to include apertures or openings, as described below with reference to FIG. 3F. The conductive gasket 300 and the shield cover 350 are positioned over the channels of the channel shields 101-104, as shown in FIG. 3A, and the staking posts of the channel spacers 211-214 extend through the conductive gasket 300 and the shield cover 350.

After the wafer insert 200 and the signal conductors 401-408, the channel shields 101-104, the conductive gasket 300, and the shield cover 350 are assembled together, a separate heat staking process step can be performed to secure the wafer assembly 50A together. Particularly, the staking posts of the wafer insert 200 are heat staked and remolded, in part, to form staking caps in a separate process step. A number of staking caps, such as the staking caps 210A-210C, among others, are illustrated in FIGS. 3A and 3B. The staking caps 210A-210C secure the channel shields 101-104, the conductive gasket 300, and the shield cover 350 together with the wafer insert 200 and the signal conductors 401-408, to hold the wafer assembly 50A together.

The wafer insert 200 of the wafer assembly 50A includes retention channels 220 and 221 at the ends of the wafer insert 200. The wafer inserts of the other wafer assemblies 50 also include similar retention channels and both ends. The retention clips 22 and 24 include a number of retention tabs. Referring back to FIG. 2A, the retention clip 22 includes the retention tabs 23, and the retention clip 24 also includes similar retention tabs. When the retention clip 22 is inserted through the retention slit 26 in the housing 20 (see FIGS. 1A and 1B), the retention tabs 23 extend between and interlock into the retention channels of the wafer assemblies 50, holding and securing them in place with respect to the housing 20 in the connector 10. For example, the retention tab 23A of the retention clip 22 extends into the retention channel 220 of the wafer assembly 50A, as shown in FIG. 2A, and the other retention tabs 23 extend into similar retention tabs among the wafer assemblies 50. Additionally, the retention clip 24 is inserted through another retention slit at an opposite side of the housing 20 (i.e., the opposite side of the housing 20 shown in FIG. 1B), and the retention tabs of the retention clip 24 extend between and interlock into retention channels on another side of the wafer assemblies 50, including into the retention channel 221 of the wafer assembly 50A.

Figure 3E:
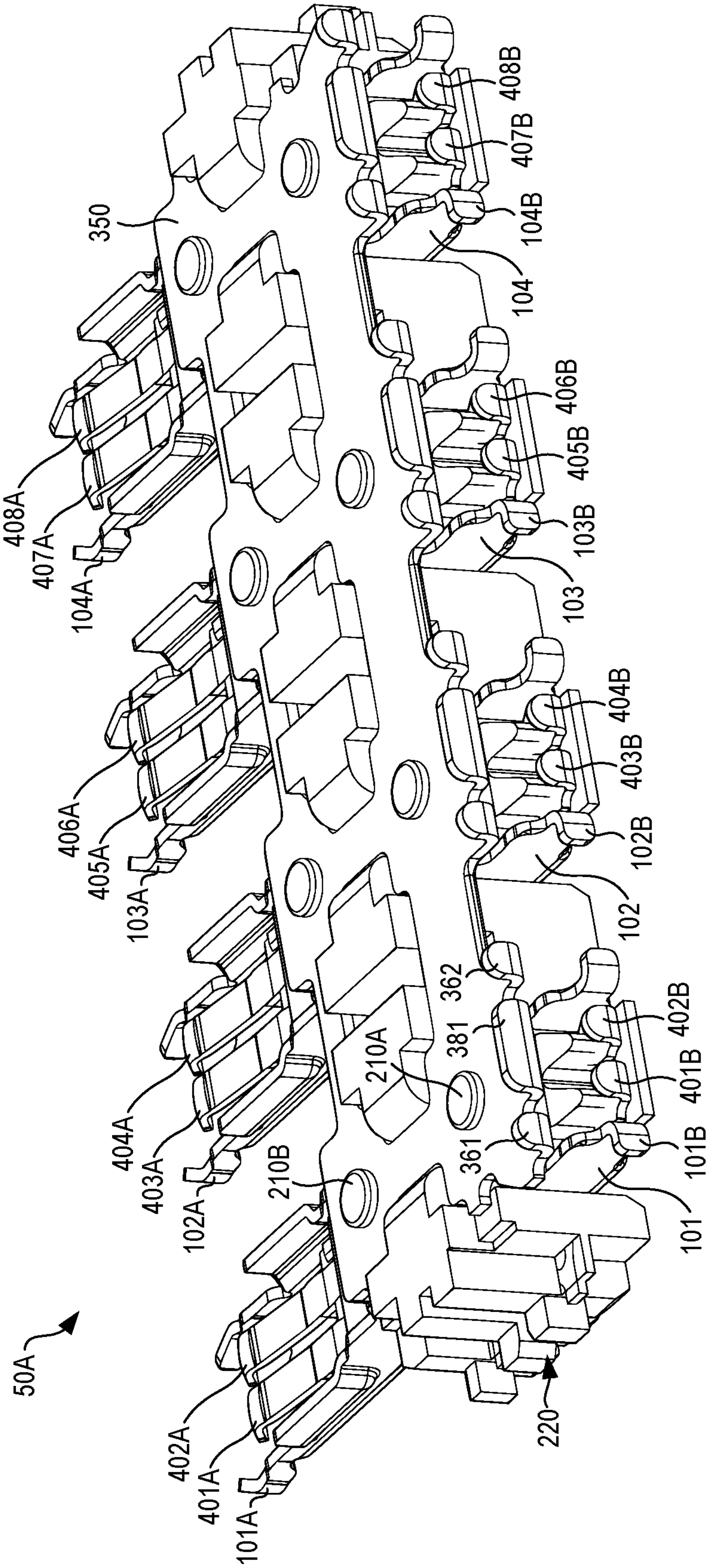
FIG. 3E illustrates a perspective view of the wafer assembly shown in FIG. 3A according to various aspects of the present disclosure.
Figure 3F:
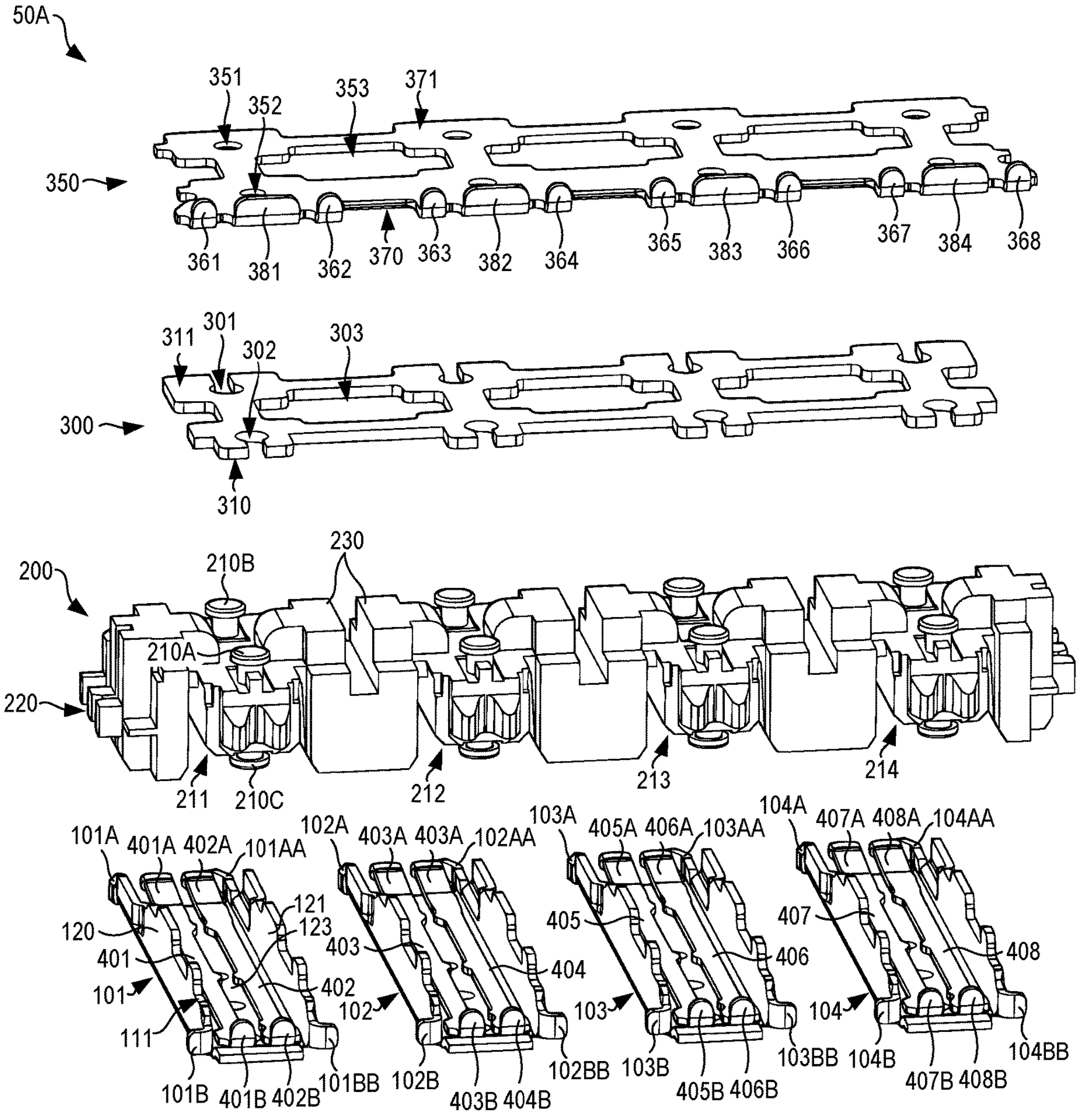
FIG. 3F illustrates an exploded perspective view of the wafer assembly shown in FIG. 3A according to various aspects of the present disclosure.

FIG. 3E illustrates a perspective view of the wafer assembly 50A, and FIG. 3F illustrates an exploded perspective view of the wafer assembly 50A. As best shown in FIG. 3F, the conductive gasket 300 is interposed between the shield cover 350, on one side, and surfaces of the wafer insert 200 and the channel shields 101-104, on another side, when the wafer assembly 50A is assembled.

The conductive gasket 300 can be formed from a conductive elastomeric or foam material. The conductive gasket 300 is elastic and compressible to some extent. As one example, the conductive gasket 300 can be embodied as a polyurethane foam multi-laminate including conductive materials, such as copper, nickel, or other conductive metals or materials. In one particular example, the conductive gasket 300 can be embodied as the P-SHIELD® brand PS-1323 conductive foam or conductive foam tape or sheet manufactured by Polymer Science, Inc. of Monticello, Indiana, although other suitable types of conductive elastomeric or foam materials can be relied upon. The conductive gasket 300 can range in thickness from between 0.1-3 mm, and example thicknesses include 0.5 mm, 1.0 mm, 1.5 mm, 2.0 mm, 2.5 mm, 2.5 mm, and 3.0 mm, although other thicknesses can be relied upon. The conductive gasket 300 includes a bottom surface 310 and a top surface 311, as well as a number of apertures or openings through the conductive gasket 300, as described below.

The shield cover 350 can be formed from (e.g., stamped, sheared, or otherwise formed out of) a flat sheet of metal or other conductive material. The shield cover 350 can range in thickness from between 0.5-2 mm, and example thicknesses include 0.5 mm, 1.0 mm, 1.5 mm, and 2.0 mm, although other thicknesses can be relied upon.

Along one side, the shield cover 350 includes side tail contacts 361-368 and center tail contacts 381-384. The side tail contacts 361-368 and center tail contacts 381-384 are formed as J-leads for SMT coupling to a PCB in the example shown. The tail contacts of the shield cover 350 can also be formed as EON or other styles of contacts in other cases. The center tail contact 381 is positioned between the two side tail contacts 361 and 362, the center tail contact 382 is positioned between the two side tail contacts 363 and 364, the center tail contact 383 is positioned between the two side tail contacts 365 and 366, and the center tail contact 384 is positioned between the two side tail contacts 367 and 368. In the wafer assembly 50A, the center tail contact 381 of the shield cover 350 is positioned next or adjacent to the signal tail contact ends 401B and 402B of the signal conductors 401 and 402, as shown in FIG. 3E. Additionally, the side tail contacts 361 and 362 of the shield cover 350 are positioned next or adjacent to the shield tail contact ends 101B and 101BB of the channel shield 101, as shown in FIG. 3E. The other tail contact ends of the shield cover 350 are positioned adjacent to the other shield tail contact ends of the other channel shields and the other signal tail contact ends of the other signal conductors in the wafer assembly 50A, as also shown in FIG. 3E. The arrangements of the tail end contacts in the wafer assembly 50A are also described below with reference to FIG. 3G.

Both the conductive gasket 300 and the shield cover 350 include a number of apertures or openings. For example, the shield cover 350 includes apertures 351-353, among others. Additionally, the conductive gasket 300 includes apertures 301-303, among others. The staking posts of the wafer insert 200 can extend through the apertures of the conductive gasket 300 and the shield cover 350 during assembly of the wafer assembly 50A, before the staking posts are heat staked to form the staking caps 210A-210C, among others. The positions and arrangement of the apertures through the conductive gasket 300 and the shield cover 350 are illustrated as a representative example, and other configurations can be relied upon. The staking posts of the wafer insert 200 extend through the apertures 301 and 302 in the conductive gasket 300 and through the apertures 351 and 352 in the shield cover 350, when the wafer assembly 50A is assembled. Additionally, the positioning mount 230 of the wafer insert 200 extends through the positioning aperture 303 of the conductive gasket 300 and through the positioning aperture 353 of the shield cover 350. The staking caps 210A and 210B, among others, are formed over the top surface 371 of the shield cover 350 during a heat staking process, after the components of the wafer assembly 50A are arranged together.

In some cases, a conductive adhesive can be applied between the top surface 311 of the conductive gasket 300 and the bottom surface 370 of the shield cover 350, to hold the conductive gasket 300 together with the shield cover 350. Together, the conductive gasket 300 and the shield cover 350 are relied upon to enclose edges of the channel shields 101-104, along at least a portion of the length of the channel shields 101-104. In that way, the conductive gasket 300 and the shield cover 350 help to enclose and shield the signal conductors 401-408 that extend within the channel shields 101-104. Both the conductive gasket 300 and the shield cover 350 are conductive and are electrically coupled to a common or ground network in the connector 10. Thus, the conductive gasket 300 and the shield cover 350 provide a type of electromagnetic radiation shield, reducing cross-talk coupling and related signal interference among the signal conductors 401-408 in the connector 10.

Due to manufacturing tolerances and related factors, open edges along the U-shaped channel shields 101-104 do not necessarily lie in the exact same plane. Due to its elastomeric properties, the conductive gasket 300 can be compressed against open edges of the U-shaped channel shields 101-104, along at least a portion of the length of the channel shields 101-104, making continuous contact across and along the open edges. The conductive gasket 300 achieves a better seal and closure along open edges of the channel shields 101-104 than the shield cover 350 could make alone. The enhanced shielding provided by the conductive gasket 300 helps to maintain signal integrity on the signal conductors 401-408 and facilitates higher data throughput for the connector 10. The conductive properties of the conductive gasket 300 also electrically couples and commons potentials among the channel shields 101-104. The shield cover 350 also helps to enclose the channel shields 101-104 and holds the conductive gasket 300 in place.

FIG. 3F also illustrates how the channel shields 101-104 are formed as U-shaped shields. Each of the channel shields 101-104 includes a pair of sidewalls which extend substantially orthogonal to a back wall, to form a U-shaped shield. For example, the channel shield 101 includes a first sidewall 120, a second sidewall 121, and a back wall 123. The sidewalls 120 and 121 extend substantially orthogonal to the back wall 123. Among other contacts ends, the channel shields 101-104 include first shield lead contact ends 101A-104A and second shield lead contact ends 101AA-104AA. Referring to the channel shield 101, the first shield lead contact end 101A extends from one end of the first sidewall 120, and the second shield lead contact end 101A extends from one end of the second sidewall 121. Additionally, the channel shields 101-104 include first shield tail contact ends 101B-104B and second shield tail contact ends 101BB-104BB. Referring again to the channel shield 101, the first shield tail contact end 101B extends from another end of the first sidewall 120, and the second shield tail contact end 101BB extends from another end of the second sidewall 121.

Figure 3G:
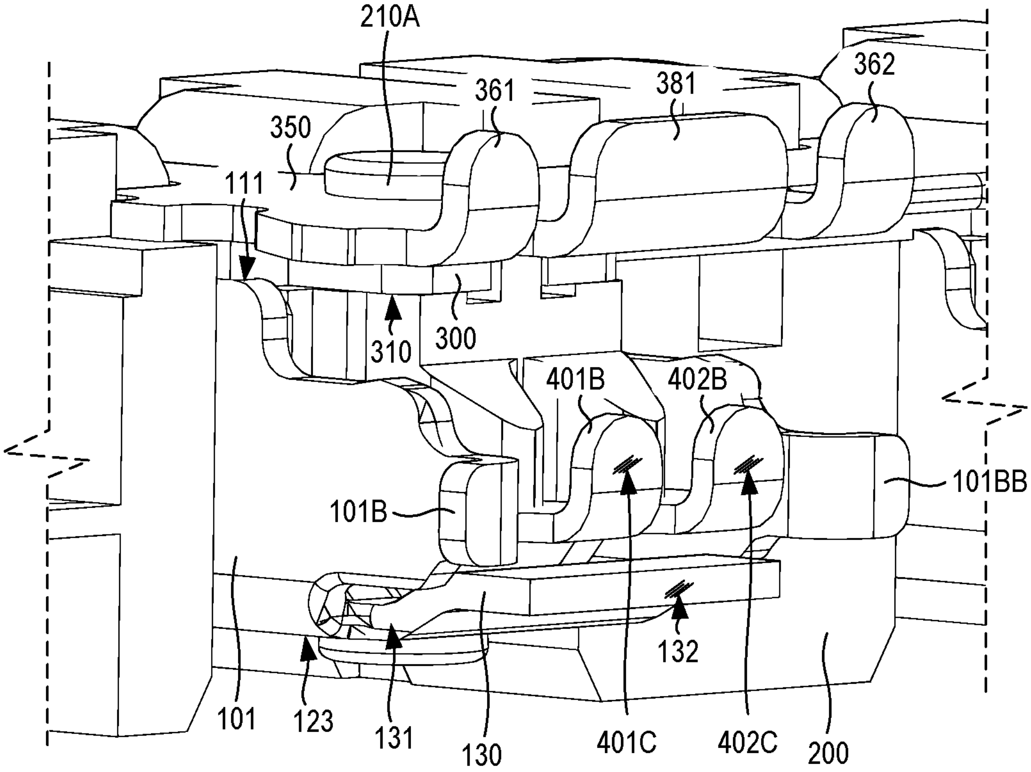
FIG. 3G illustrates tail contacts of the wafer assembly shown in FIG. 3A according to various aspects of the present disclosure.

FIG. 3G illustrates certain tail contacts of the wafer assembly 50A shown in FIG. 3A according to various aspects of the present disclosure. As shown, the center tail contact 381 of the shield cover 350 is positioned next or adjacent to the signal tail contact ends 401B and 402B of the signal conductors 401 and 402. Additionally, the side tail contacts 361 and 362 of the shield cover 350 are positioned next or adjacent to the shield tail contact ends 101B and 101BB of the channel shield 101. FIG. 3G also illustrates how the bottom surface 310 of the conductive gasket 300 contacts the top surface edge 111 of the channel shield 101, among other top surface edges of the channel shield 101, forming an electrical coupling between them.

FIG. 3G also illustrates the shield tongue 130 of the channel shield 101. Each of the other channel shields 102-104 in the wafer assembly 50A also includes a similar shield tongue. Additionally, each of the channel shields in the wafer assemblies 50 includes a shield tongue. The shield tongue 130 extends towards the center of the channel shield 101, starting from the back wall 123 of the channel shield 101. The shield tongue 130 includes a tongue bend 131, and the back wall 123 of the channel shield 101 curves towards the center of the channel shield 101 at the tongue bend 131. The distal end of the shield tongue 130 approaches but does not contact the signal tail contact ends 401B and 402B. In any case, the shield tongue 130 of the channel shield 101 extends closer to the signal tail contact ends 401B and 402B than the back wall 123. The distal end surface 132 of the shield tongue 101C does not extend to the mount end surface 401C of the signal tail contact end 401B. Similarly, the distal end surface 132 of the shield tongue 101C does not extend to the mount end surface 402C of the signal tail contact end 402B.

Figure 4A:
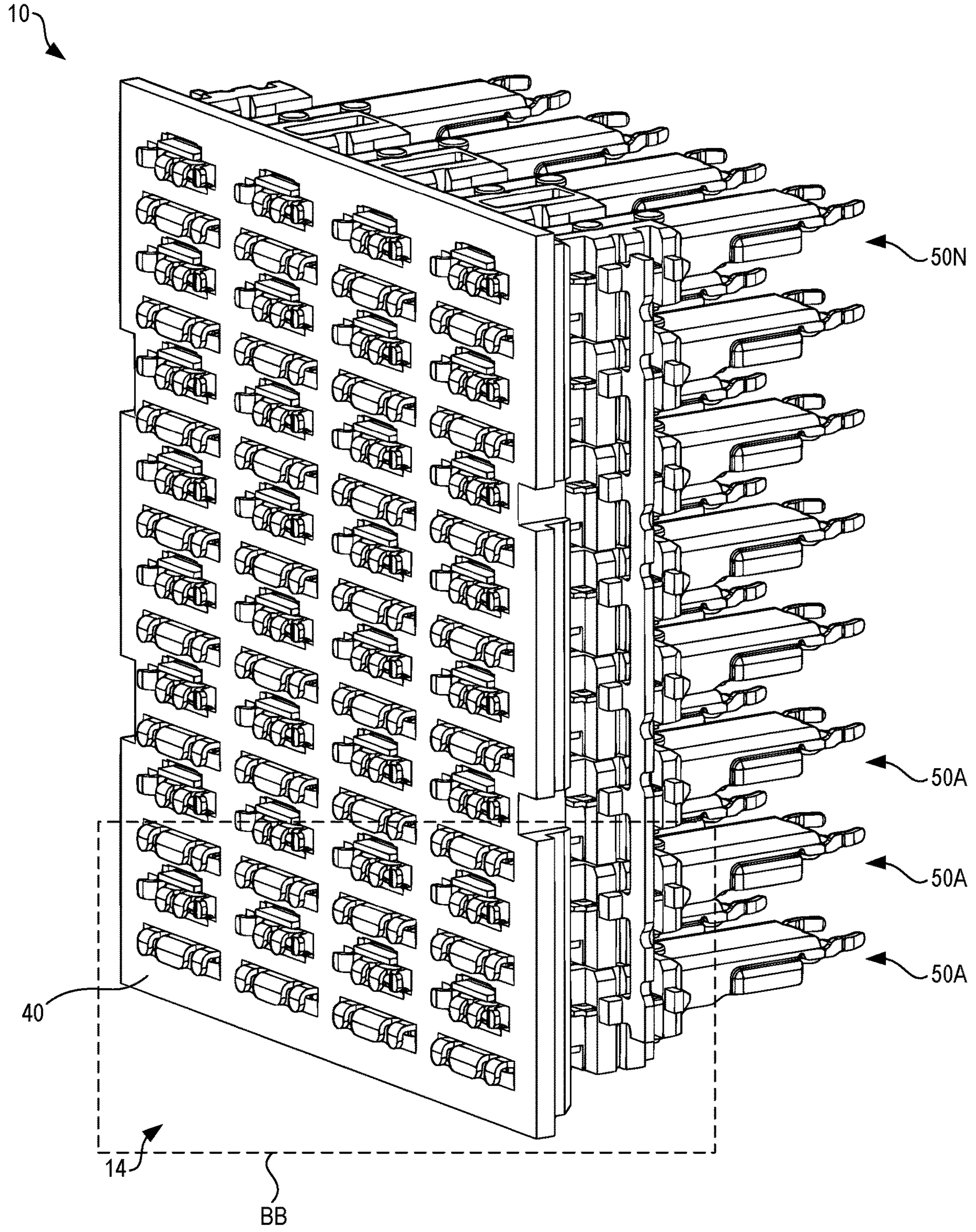
FIG. 4A illustrates parts of the bottom of the connector assembly shown in FIG. 1A according to various aspects of the present disclosure.

FIG. 4A illustrates parts of the bottom of the connector assembly 10 shown in FIG. 1A. The housing 20 and retention clips 22 and 24 are omitted from view in FIG. 4A, so that the surface interface shield 40 is visible. The surface interface shield 40 can be formed from a plated plastic material. For example, the surface interface shield 40 can be formed from LCP, PE, PTFE, or other plastic material and, in some cases, a include additives to which plating metal or metals will better adhere. The surface interface shield 40 can be formed using any suitable additive or subtractive manufacturing techniques, including molding, injection molding, printing, and other techniques. The outer surfaces of the surface interface shield 40 can be plated with a plating metal or metals for conductivity, and the surface interface shield 40 can be embodied as a plated plastic component. The surfaces can be etched in some cases and metalized or plated in a bath, barrel plated, plated by PVD, plated by electroless plating, electroplating, sputter plating, ion plating, or other plating techniques or a combination thereof. The surfaces of the surface interface shield 40 can be metalized or plated with copper, nickel, tin, silver, another other plating metal, or a combination of such plating metals.

The surface interface shield 40 provides additional shielding at the surface interface 14 of the connector 10. The surface interface shield 40 includes a number of apertures or openings, and the tail ends of the channel shields and signal conductors of each of the wafer assemblies 50 extend through the apertures or openings, as shown in FIG. 4A. The channel shields of each of the wafer assemblies 50 contact outer surfaces of the surface interface shield 40, and the channel shields in the connector 10 are electrically coupled to the surface interface shield 40. Thus, the surface interface shield 40 electrically couples all the channel shields of the wafer assemblies 50 together at the surface interface 14 of the connector 10. Additionally, the shield covers of each of the wafer assemblies 50 also extend through apertures or openings in the surface interface shield 40.

Figure 4B:
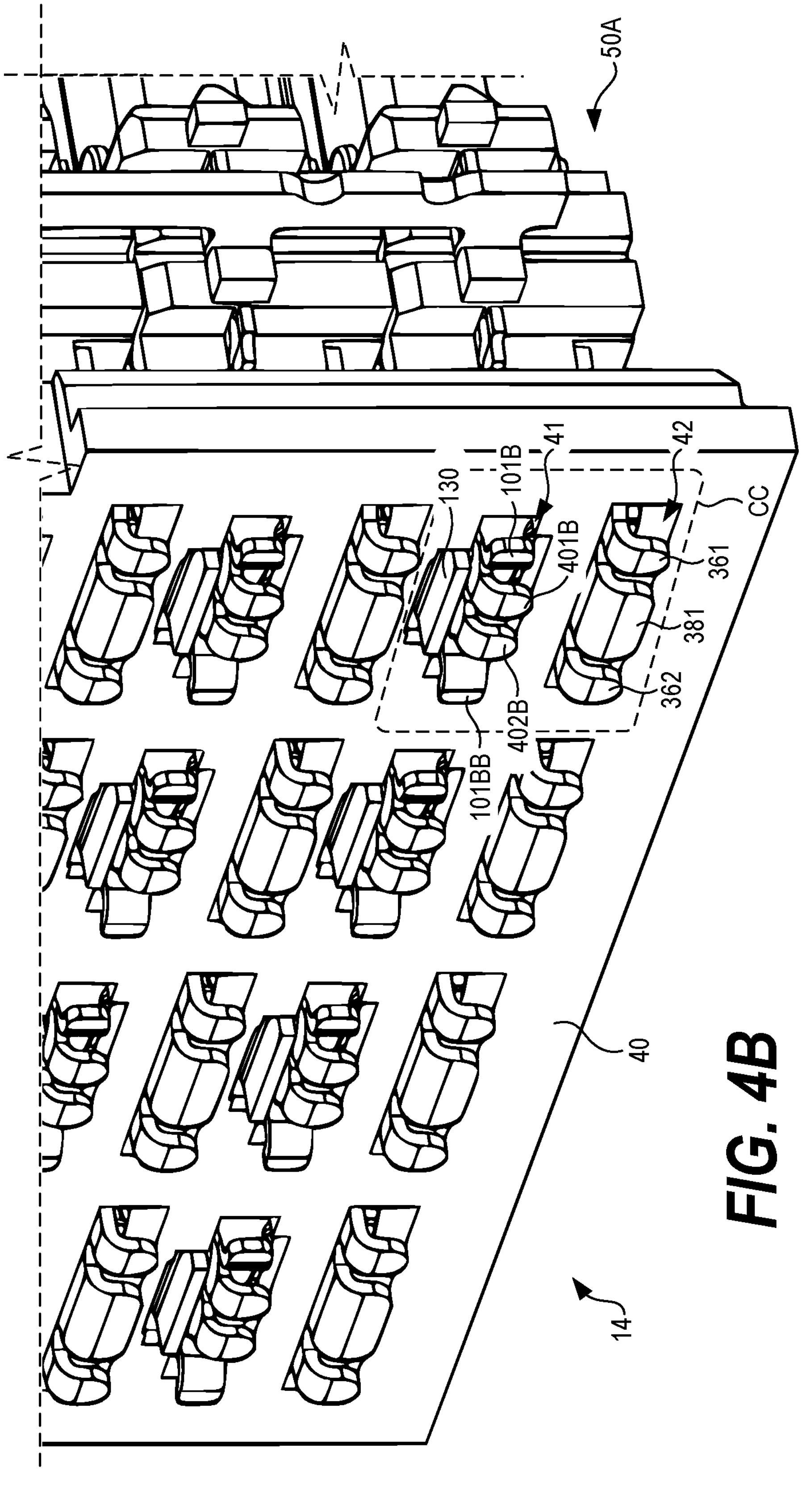
FIG. 4B illustrates a first region of the bottom of the connector assembly shown in FIG. 1A according to various aspects of the present disclosure.

FIG. 4B illustrates the view designated BB in FIG. 4A. As shown, the signal tail contact ends 401B and 402B of the signal conductors 401 and 402 of the wafer assembly 50A extend through an aperture 41 in the surface interface shield 40. Each of the signal tail contact ends of the signal conductors of the other wafer assemblies 50 in the connector 10 also extend through other apertures in the surface interface shield 40. The signal tail contact ends 401B and 402B and signal tail contact ends of the other signal conductors in the connector 10 are formed as SMT J-leads in the example shown.

The shield tail contacts ends of the channel shields of each of the wafer assemblies 50 also extend through apertures in the surface interface shield 40. For example, the channel shield 101 of the wafer assembly 50A includes shield tail contact ends 101B and 101BB. The shield tail contact ends 101B and 101BB extend through the aperture 41 in the surface interface shield 40. Outer surfaces of the channel shield 101 contact inner surfaces of the surface interface shield 40 within the aperture 41, over at least a portion of the channel shield 101. Each of the shield tail contact ends of the channel shields of the wafer assemblies 50 in the connector 10 extend through apertures in the surface interface shield 40. Additionally, outer surfaces of the other channel shield 101 in the connector 10 contact inner surfaces of other apertures through the surface interface shield 40. Thus, the surface interface shield 40 electrically couples all the channel shield among the wafer assemblies 50 in the connector 10 at the surface interface 14 of the connector 10.

The side and center tail contacts of the shield covers of each of the wafer assemblies 50 in the connector 10 also extend through apertures in the surface interface shield 40. For example, the shield cover 350 of the wafer assembly 50A includes the side tail contacts 361 and 362 and the center tail contact 381 (see also FIG. 3G). The side tail contacts 361 and 362 and the center tail contact 381 extend through the aperture 42 in the surface interface shield 40. Outer surfaces of the shield cover 350 contact inner surfaces of the surface interface shield 40 within the aperture 42, over at least a portion of the shield cover 350. Additionally, outer surfaces of the other shield covers in the connector 10 contact inner surfaces of other apertures through the surface interface shield 40. Thus, the surface interface shield 40 electrically couples all the shield covers among the wafer assemblies 50 in the connector 10 at the surface interface 14 of the connector 10. The tail contacts of the shield covers of the wafer assemblies 50 help to reduce crosstalk among the signal tail contact ends of the signal conductors of the wafer assemblies 50.

Figure 4C:
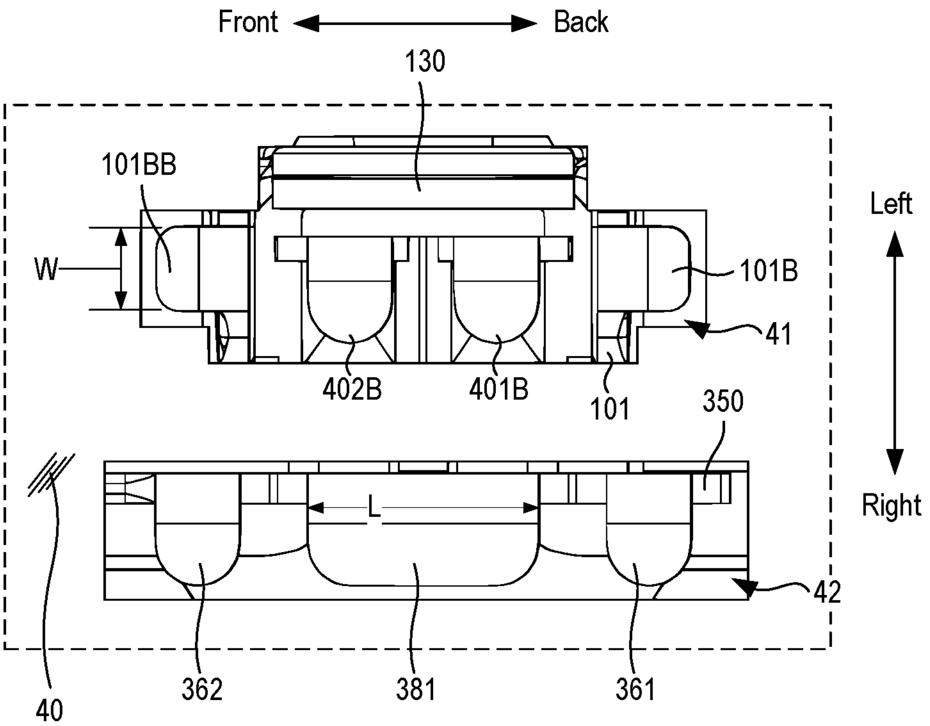
FIG. 4C illustrates a second region of the bottom of the connector assembly shown in FIG. 1A according to various aspects of the present disclosure.

FIG. 4C illustrates the view designated CC in FIG. 4B. As shown, the signal tail contact ends 401B and 402B extend through the aperture 41 in the surface interface shield 40. The shield tail contact ends 101B and 101BB also extend through the aperture 41. The side tail contacts 361 and 362 and center tail contact 381 of the shield cover 350 extend through the aperture 42 in the surface interface shield 40. The center tail contact 381 of the shield cover 350 is positioned next or adjacent to the signal tail contact ends 401B and 402B. Additionally, the side tail contacts 361 and 362 of the shield cover 350 are positioned next or adjacent to the shield tail contact ends 101B and 101BB of the channel shield 101.

As measured from the front to the back of the connector 10, the length "L" of the center tail contact 381 is the same as the distance measured from the front side surface of the signal tail contact end 402B to the back side surface of the signal tail contact end 401B. In other examples, the length "L" of the center tail contact 381 can be larger than the distance between the outer side surfaces of the signal tail contact ends 401B and 402B, but the length "L" is preferably not shorter than that distance. The size of the center tail contact 381 can be tailored or tuned to reduce crosstalk interference at the surface interface 14 of the connector 10.

As measured from the left to the right of the connector 10, the width "W" of the shield tail contact ends 101B and 101BB is the same as the distance measured from the left side surface of the signal tail contacts ends 401A and 402B to the right side surface of the signal tail contact ends 401 A and 402B. In other examples, the width "W" of the shield tail contact ends 101B and 101BB can be larger, but the width "W" is preferably not shorter that shown. The size of the shield tail contact ends 101B and 101BB can be tailored or tuned to reduce crosstalk interference at the surface interface 14 of the connector 10.

Figure 4D:
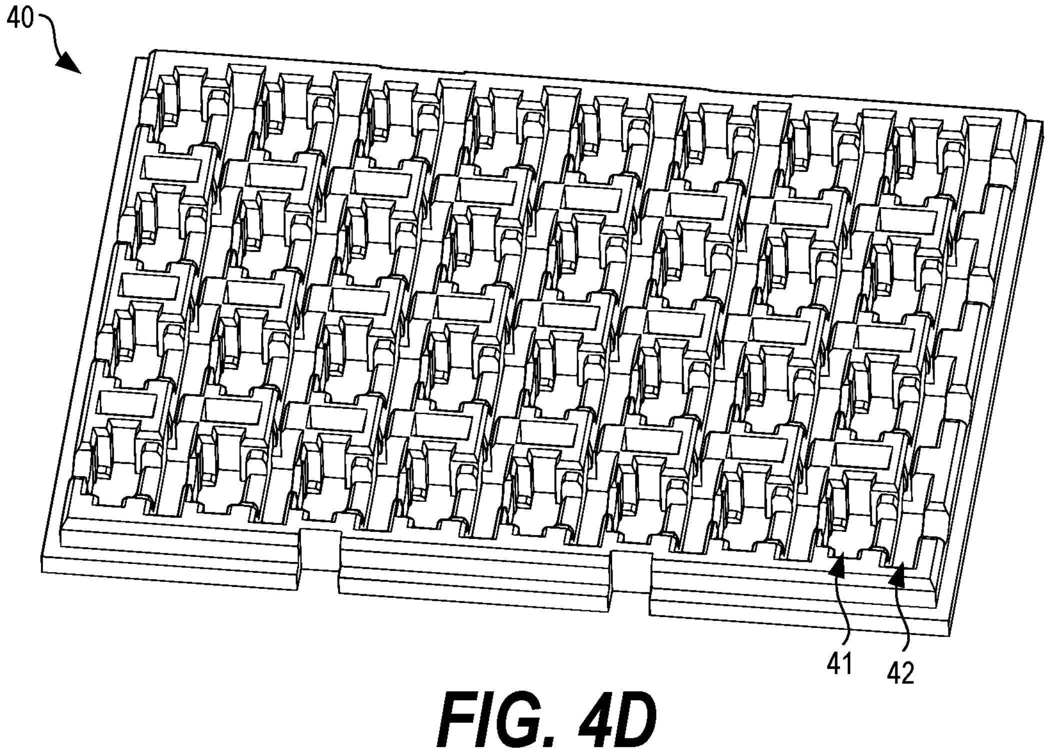
FIG. 4D illustrates the surface interface shield of the connector assembly shown in FIG. 1A according to various aspects of the present disclosure.

FIG. 4D separately illustrates the surface interface shield 40 of the connector 10. Particularly, FIG. 4D illustrates the top side of the surface interface shield 40, which is opposite to the side of the surface interface shield 40 that is shown in FIGS. 4A-4C. The As described above, the surface interface shield 40 includes a number of apertures that extend through the surface interface shield 40. Example apertures 41 and 42 are referenced individually in FIG. 4D, and the surface interface shield 40 includes rows of apertures for each of the wafer assemblies 50 in the connector 10.

Terms such as "top," "bottom," "side," "front," "back," "right," and "left" are not intended to provide an absolute frame of reference. Rather, the terms are relative and are intended to identify certain features in relation to each other, as the orientation of structures described herein can vary. The terms "comprising," "including," "having," and the like are synonymous, are used in an open-ended fashion, and do not exclude additional elements, features, acts, operations, and so forth. Also, the term "or" is used in its inclusive sense, and not in its exclusive sense, so that when used, for example, to connect a list of elements, the term "or" means one, some, or all of the elements in the list.

Combinatorial language, such as "at least one of X, Y, and Z" or "at least one of X, Y, or Z," unless indicated otherwise, is used in general to identify one, a combination of any two, or all three (or more if a larger group is identified) thereof, such as X and only X, Y and only Y, and Z and only Z, the combinations of X and Y, X and Z, and Y and Z, and all of X, Y, and Z. Such combinatorial language is not generally intended to, and unless specified does not, identify or require at least one of X, at least one of Y, and at least one of Z to be included. The terms "about" and "substantially," unless otherwise defined herein to be associated with a particular range, percentage, or related metric of deviation, account for at least some manufacturing tolerances between a theoretical design and manufactured product or assembly, such as the geometric dimensioning and tolerancing criteria described in the American Society of Mechanical Engineers (ASME®) Y14.5 and the related International Organization for Standardization (ISO®) standards. Such manufacturing tolerances are still contemplated, as one of ordinary skill in the art would appreciate, although "about," "substantially," or related terms are not expressly referenced, even in connection with the use of theoretical terms, such as the geometric "perpendicular," "orthogonal,""vertex,""collinear,""coplanar,"and other terms.

The above-described embodiments of the present disclosure are merely examples of implementations to provide a clear understanding of the principles of the present disclosure. Many variations and modifications can be made to the above-described embodiments without departing substantially from the spirit and principles of the disclosure. In addition, components and features described with respect to one embodiment can be included in another embodiment. All such modifications and variations are intended to be included herein within the scope of this disclosure.

What is claimed is:

1. A connector assembly, comprising:

a plug mating interface;

a surface mating interface; and a wafer assembly between the plug mating interface and the surface mating interface, the wafer assembly comprising:

a wafer insert;

a channel shield;

a plurality of signal conductors extending within the channel shield and through the wafer insert;

a conductive gasket positioned over open edges of the channel shield; and a shield cover positioned over the conductive gasket.

2. The connector assembly according to claim 1, wherein the conductive gasket comprises a conductive elastomeric gasket.

3. The connector assembly according to claim 2, wherein the conductive gasket is positioned between the shield cover and the open edges of the channel shield.

4. The connector assembly according to claim 1, wherein:

the wafer assembly further comprises a second channel shield; and the conductive gasket is positioned over open edges of the channel shield and over second open edges of the second channel shield.

5. The connector assembly according to claim 1, wherein:

the channel shield comprises shield tail contacts ends;

the shield cover comprises side tail contacts and a center tail contact;

the plurality of signal conductors comprise signal tail contact ends; and the signal tail contact ends of the plurality of signal conductors are positioned between the shield tail contacts ends of the channel shield and adjacent to the center tail contact of the shield cover at the surface mating interface.

6. The connector assembly according to claim 5, wherein:

the channel shield further comprises a shield tongue; and the signal tail contact ends of the plurality of signal conductors are positioned between the shield tail contacts ends of the channel shield, in a front to back direction of the connector assembly, and between the center tail contact of the shield cover and the shield tongue of the channel shield, in a left to right direction of the connector assembly, at the surface mating interface.

7. The connector assembly according to claim 1, further comprising a surface interface shield positioned at the surface mating interface of the connector assembly.

8. The connector assembly according to claim 7, wherein the surface interface shield comprises a plated plastic.

9. The connector assembly according to claim 8, wherein, at the surface mating interface, the channel shield and the plurality of signal conductors extend through an aperture in the surface interface shield.

10. The connector assembly according to claim 9, wherein, at the surface mating interface, the channel shield contacts inner surfaces of the aperture in the surface interface shield.

11. The connector assembly according to claim 10, wherein:

at the surface mating interface, the shield cover extends through a second aperture in the surface interface shield; and the shield cover contacts inner surfaces of the second aperture in the surface interface shield.

12. A wafer assembly, comprising:

a wafer insert;

a channel shield;

a plurality of signal conductors extending within the channel shield and through the wafer insert;

a conductive gasket positioned over open edges of the channel shield; and a shield cover positioned over the conductive gasket.

13. The wafer assembly according to claim 12, wherein the conductive gasket comprises a conductive elastomeric gasket.

14. The wafer assembly according to claim 13, wherein the conductive gasket is positioned between the shield cover and the open edges of the channel shield.

15. The wafer assembly according to claim 12, wherein:

the wafer assembly further comprises a second channel shield; and the conductive gasket is positioned over open edges of the channel shield and over second open edges of the second channel shield.

16. The wafer assembly according to claim 12, wherein:

the channel shield comprises shield tail contacts ends;

the shield cover comprises side tail contacts and a center tail contact;

the plurality of signal conductors comprise signal tail contact ends; and the signal tail contact ends of the plurality of signal conductors are positioned between the shield tail contacts ends of the channel shield and adjacent to the center tail contact of the shield cover.

17. The wafer assembly according to claim 16, wherein:

the channel shield further comprises a shield tongue; and the signal tail contact ends of the plurality of signal conductors are positioned between the shield tail contacts ends of the channel shield, in a front to back direction of the wafer assembly, and between the center tail contact of the shield cover and the shield tongue of the channel shield, in a left to right direction of the wafer assembly.

18. A connector assembly, comprising:

a wafer assembly comprising:

a wafer insert;

a channel shield;

a plurality of signal conductors extending within the channel shield and through the wafer insert;

a conductive gasket positioned over open edges of the channel shield; and a shield cover positioned over the conductive gasket; and a surface interface shield.

19. The connector assembly according to claim 18, wherein:

the conductive gasket comprises a conductive elastomeric gasket and provides a conductive shield over open edges of the channel shield; and the conductive gasket is positioned between the shield cover and the open edges of the channel shield.

20. The connector assembly according to claim 18, wherein:

the surface interface shield comprises a plated plastic;

the channel shield and the plurality of signal conductors extend through an aperture in the surface interface shield; and the channel shield contacts inner surfaces of the aperture in the surface interface shield.

* * * * *